Feb. 22, 1944. C. P. XENIS ET AL 2,342,567
METHOD AND APPARATUS FOR INDICATING THE FUEL RATE
AND EFFICIENCY OF POWER PLANTS
Filed Jan. 10, 1942 2 Sheets-Sheet 1
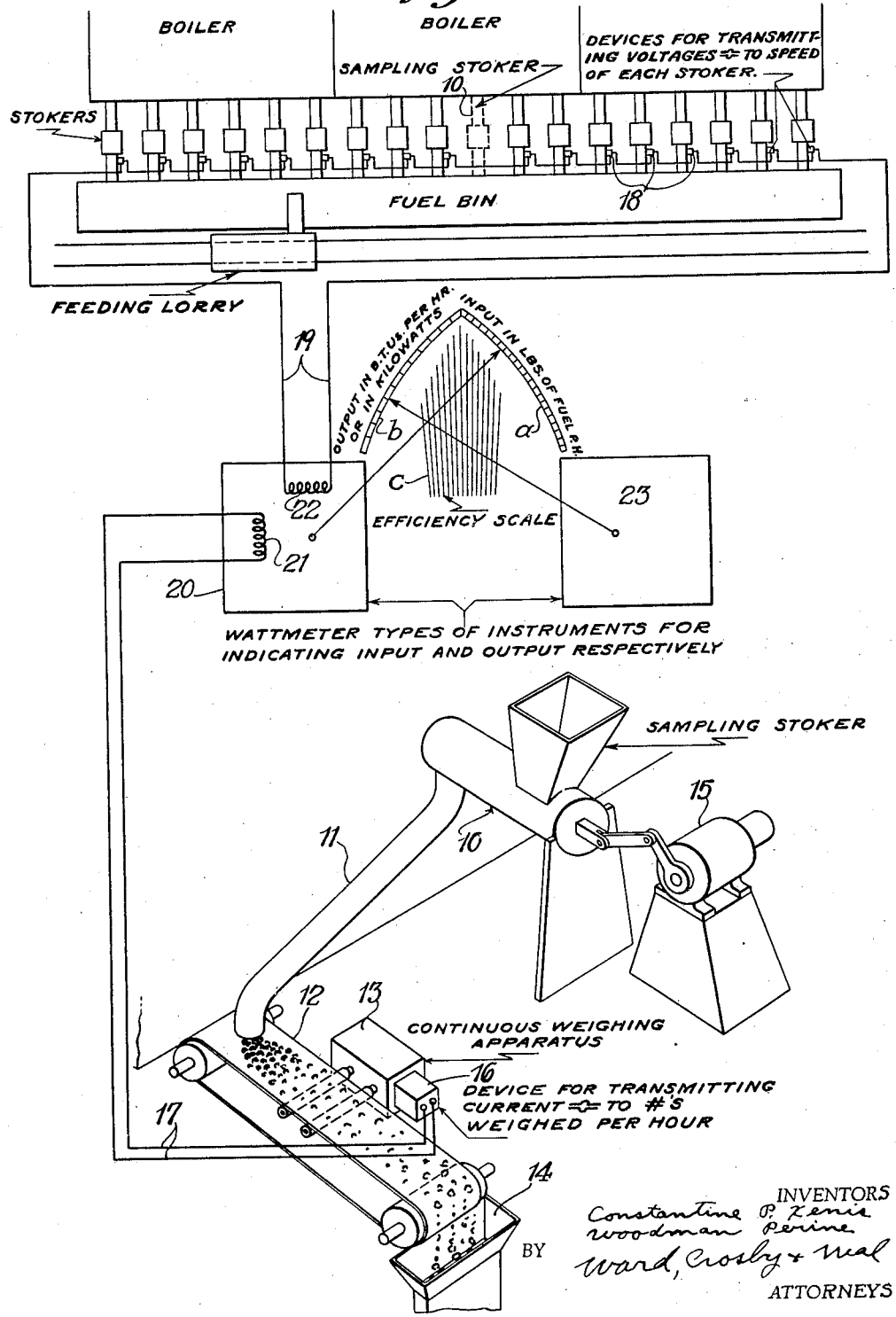

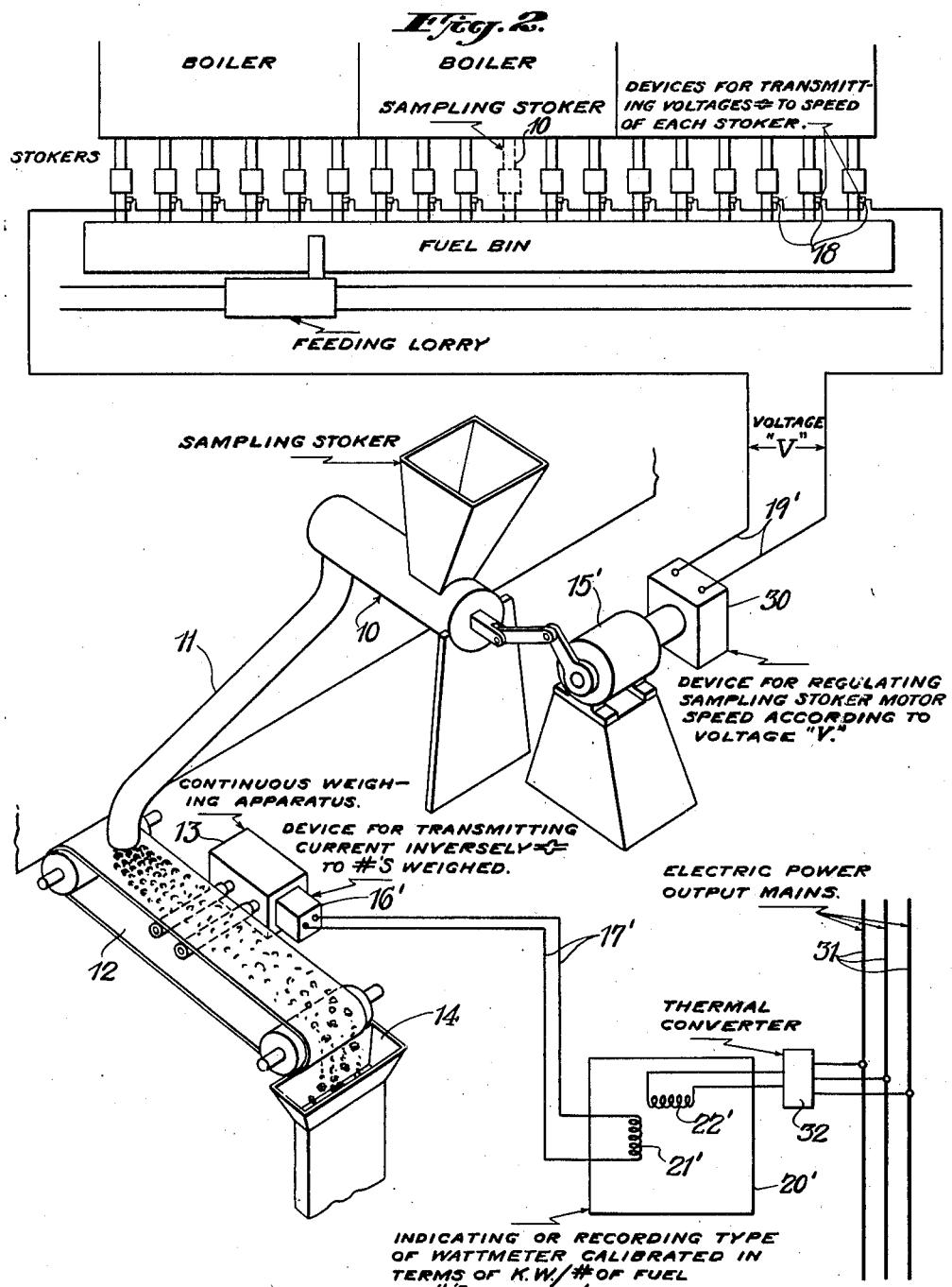

Patented Feb. 22, 1944

2,342,567

UNITED STATES PATENT OFFICE 2,342,567

METHOD AND APPARATUS FOR INDICATING THE FUEL RATE AND EFFICIENCY OF POWER PLANTS

Constantine P. Xenis, Douglas Manor, and Woodman Perine, Halesite, N. Y., assignors to Consolidated Edison Company of New York, Inc., New York, N. Y., a corporation of New York Application January 10, 1942, Serial No. 426,280

8 Claims. (Cl. 73—51)

This invention relates to methods and apparatus for indicating or measuring the approximate rate of the total supply of fuel as fed by a plurality of fuel feeding devices such for example, as automatic stokers, and for also comparing such measurements if desired, with the useful output energy derived from combustion of the fuel, in order to provide indications or records of the efficiency of a power plant.

If for a battery of boilers, the weight of coal delivered to the fuel beds per stroke of the stoker rams or plungers were known, then to determine the fuel rate to these boilers, it would only be necessary to measure the speeds of the various stoker rams or groups of rams and multiply the summation of such speeds by the fuel weight per stroke, to obtain a product representing the total fuel rate. A convenient way of obtaining an indication representing the sum of the stoker speeds (i. e., the number of strokes per unit of time) would be to use devices at each stoker drive for transmitting a voltage corresponding to the stoker speed, and then to add these voltages in an electrical circuit. A suitably calibrated voltmeter responsive to this total voltage would then deflect an amount proportional to the total strokes per unit of time, and the readings could be given in terms of total pounds of fuel per unit of time. However, because of variables such as size and shape of coal lumps and particles, moisture content of coal, etc., the weight of coal per stroke will vary considerably. Accordingly, we have found that such variations, as well as the varying stoker speeds have to be taken into consideration in practice, in determining the fuel rate for a group of stokers.

In accordance with the present invention, the weight of fuel per average stroke is determined by supplying what will be hereinafter referred to as a "sampling stoker," with fuel typical and representative of that being fed to a battery of stokers. Such "sampling stoker" may not necessarily be a complete stoking device delivering coal to a boiler, but should preferably be a plunger system of a design and with dimensions such that with each stroke it will feed an amount of coal weighing substantially the same as the amount fed per average stroke of the plurality of stokers for which the fuel rate is to be determined. According to one form of the invention, such "sampling stoker" may operate at a predetermined substantially constant rate. The fuel thus sampled is then discharged to a continuous weighing apparatus of suitable known type, equipped with a device to transmit a primary quantity such, for example, as an electrical current proportional to pounds of fuel weighed per unit of time. And since the sampling system operates at a constant rate, this quantity actually represents pounds of fuel per sampling stroke, which is approximately equal to the pounds of fuel per stroke of the operating stokers. Then if this varying electrical current is multiplied, as by means of a wattmeter type of instrument, with the varying voltage above referred to, representing total strokes per unit of time, then the wattmeter deflection at any moment will represent the fuel rate to the battery of boilers. The wattmeter instrument may be calibrated in terms of pounds of fuel per hour.

Then if it is desired to indicate the efficiency with which steam is generated by the boilers, or the efficiency for example of an electric power generating plant supplied with such fuel, the above mentioned wattmeter indications may be suitably correlated with indications representing the steam output, or the electric power output, to give efficiency indications, i. e., the quotient of the input divided by the output at any moment.

Alternately, according to the present invention, a "sampling stoker" as above referred to may be operated at a variable rate determined and controlled by the voltage representing the sum of the speeds of the operating stokers. That is, the sampling stoker may be operated at a rate proportional to the total strokes per unit of time of a plurality of the operating stokers. Under these conditions, the current transmitted from the continuous weighing apparatus will provide a direct indication of the total pounds of fuel per unit of time fired to all of the battery of boilers. As hereinafter explained, such indications may be conveniently used in conjunction with energy output measurements to provide recordable indications of either the varying power output per unit of fuel input, or the varying power input per unit of power output.

Various further and more specific objects, features and advantages will more clearly appear from the detailed description given below taken in connection with the accompanying drawings which form a part of this specification and illustrate merely by way of example, preferred forms of the invention. The invention consists in such novel features, arrangements and combinations of parts as may be shown and described in connection with the apparatus herein disclosed and also such novel methods as are disclosed and described hereinafter.

In the drawings:

Figs. 1 and 2 respectively show diagrammatic arrangements of apparatus and circuits for two embodiments of the invention.

In both figures, a battery of boilers are indicated as equipped each with a plurality of stokers to which coal is supplied as required from a fuel bin, in a suitable well-known way, as by a feeding lorry.

As shown, a "sampling stoker" 10 may be located among the battery of stokers at a suitable point where it will receive coal from the feeding lorry fairly representative of the character of coal being fed to all of the various operating stokers. A suitable position for the sampling stoker, among the battery of stokers, is indicated in both figures by dotted lines. In lower portions of each figure an enlarged and somewhat diagrammatic view of the sampling stoker is shown in further detail. Instead of feeding fuel into a boiler, the sampling stoker preferably discharges the fuel fed thereby through a spout as at 11, onto a conveyor belt as at 12 and upon which the fuel may be automatically weighed by a suitable known type of continuous weighing apparatus indicated at 13. From the conveyor belt 12, the fuel after being weighed may be discharged and returned as through a spout 14 to the fuel bin.

Referring now more particularly to Fig. 1, in this case the sampling stoker motor 15 is intended to operate at a suitable predetermined constant speed, so that the only substantial variation in the weight of fuel as fed from the sampling stoker will be due to variations in the size, character, moisture content, etc., of the fuel particles or lumps. Hence, the continuous weighing apparatus may be accompanied by a suitable known type of device 16, whereby the weight measurements as made will serve to transmit through wires 17 a current, hereinafter referred to as an electrical analogue, varying in direct proportion to the pounds weighed per unit of time. Also, it will be apparent that such analogue will vary substantially in accordance with the varying weight of fuel per sampling stroke.

Each of the operating stokers may be accompanied by devices as at 18 of a suitable known type for transmitting a voltage varying directly with the speed or rate of operation of each operating stoker. These devices may comprise for example, any well-known form of generator which will give a small potential of a value proportional to the speed of the stoker motor or drive shaft to which the generator is connected. These devices may conveniently be connected in series so as to add such voltages, whereby the summation will comprise another electrical analogue in the form of a voltage across wires 19, representing and varying in accordance with the total number of strokes per unit of time for all the plurality of operating stokers.

It is now merely necessary to multiply by each other the electrical analogues of circuits 17 and 19 to obtain an indication or measurement representing at any moment the total fuel rate for all the operating stokers. Since the first of these analogues is in the form of a current and the second in the form of a voltage, such multiplication may conveniently be effected electromagnetically in a wattmeter type of instrument 20, by applying the current to a current coil 21 of the wattmeter, and the voltage to a potential coil 22 of the wattmeter. The scale $a$ of the instrument 20 may then be calibrated in terms of input in pounds of fuel per hour.

Such input indications may readily be correlated with simultaneous indications of the energy output resulting from the combustion of the fuel, for example in the following way. If the comparison is desired with respect to the energy of the steam output of the boilers, suitable apparatus such for example as disclosed in the copending applications of Xenis et al., Ser. Nos. 392,908 and 392,909, filed May 10, 1941, may be provided to measure the heat value of the total steam output and to indicate such value by a wattmeter type of instrument as at 23, having a scale $b$ which may be calibrated in terms of output in B. t. u.'s per hour. On the other hand, if it is desired to compare the fuel input with respect to the electric power ouput, then the instrument 23 may comprise a wattmeter connected to the electric power output mains and calibrated to read in kilowatts on the scale $b$. The readings of the instruments 20 and 23 may be correlated in various ways, one example of which is shown in Fig. 1 in the form of an "efficiency scale" $c$ so calibrated and designed that the crossing points for the indicator hands on the two instruments will indicate on scale $c$ at any moment the quotient of the input and output readings.

Several of the important principles of the invention may be utilized in an alternative way with the embodiment of apparatus shown in Fig. 2. The parts which are the same in Figs. 1 and 2 are identified in like manner, and parts in Fig. 2 similar to those of Fig. 1 are identified by similar reference characters accompanied by prime marks. Except as to features hereinafter explained, the arrangement of Fig. 2 may be constructed to operate in the same manner as the arrangement of Fig. 1.

In Fig. 2 the sampling stoker motor 15' instead of being driven at a predetermined constant speed, may be regulated by a suitable known type of device as at 30, whereby the speed is varied in accordance with and by the voltage across circuit wires 19', i. e., the voltage "V" representing the sum of the speeds or rates of operation of the operating stokers and hence varying in accordance with the total number of strokes per unit of time for all the stokers. Then in that event, the current transmitted by the automatic device 16' as controlled by the automatic weighing apparatus 13, will vary in accordance with the total fuel rate for the battery of boilers. In other words, the variations of the speed of the motor 15' will cause the sampling stoker to operate at a rate representative of the total rate of stoking, and hence the automatic weighing of the coal from the sampling stoker will in effect cause the speed measurements and the weight variations due to the character of the fuel, to be correlated whereby the current transmitted from the device 16' is controlled to the proper extent by both of these factors, viz., the rate of operation of the stokers and the character of the fuel.

The current transmitted from device 16' through wires 17' with the arrangement of Fig.

2, if desired may be correlated with output measurements as above explained in connection with Fig. 1. However, with the particular form of connections shown in Fig. 2, an advantageous arrangement is made possible permitting the input and output measurements to be correlated in a standard type of indicating or recording wattmeter at 20', which may be calibrated in terms of kilowatts per pound of fuel, or, alternatively, in terms of pounds of fuel per kilowatt.

The wattmeter instrument 20' or a generally equivalent type of instrument, may be connected as follows, to perform in substance the operation of indicating or recording, from moment to moment, the quotients of the input and output measurements. The current circuit 17' may be connected into the device 16' in a suitable known way, whereby the current transmitted to current coil 21' of the wattmeter instrument will be inversely proportional to the pounds weighed. If the electrical power output is carried for example, by three-phase mains as shown at 31, then a suitable form of so-called thermal converter 32 may be so connected to these mains as to deliver in its output circuit a voltage to potential coil 22' of the wattmeter instrument, which voltage will be varied by and in accordance with the power output. A device commercially available under the name "Lincoln thermal converter" may be used at 32 for this purpose. Since the wattmeter 20' will in effect serve to multiply electromagnetically the potential in coil 22' by the current in coil 21', and since the current in the latter coil represents the reciprocal of the pounds of fuel weighed, it will be apparent that in effect the wattmeter 20' will serve to indicate the quotients of the input and output measurements. Thus an indicating scale of instrument 20' (or the recording chart therefor if a recording instrument is used), may be calibrated in terms of kilowatts per pound of fuel, or if desired, calibrated with an inverse scale in terms of pounds of fuel per kilowatt. Thus by maintaining electrical analogues with connections of the type shown, and varying in accordance with the input and output measurements, the necessary operation of dividing one factor by another to determine efficiency, may be accomplished with a standard type of wattmeter, the readings of which may be more readily recorded than could the crossed pointer readings of the arrangement of Fig. 1.

With the arrangements of both Figs. 1 and 2, it will be observed that the analogues representing the varying sum of the rates of operation of the stokers and representing the varying weight measurements, are so correlated and combined by the apparatus that a variable magnetic force is maintained in instruments 20, 20', which force is so controlled and modified from moment to moment as to vary substantially in accordance with the varying total weight of fuel as fed per unit of time to all the plurality of operating stokers. In the case of Fig. 1, these two analogues or factors are first combined for this purpose in the instrument 20, whereas with the arrangement of Fig. 2 the analogue representing the rate of operation of the stokers is combined with the other factor by reason of the control of the speed of the sampling stoker motor, which in turn properly modifies the electrical analogue representing the weight measurements.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. In a method of indicating or measuring the approximate rate of the total supply of fuel as fed by numerous reciprocating stokers operable respectively at different and variable speeds, the steps which comprise: continuously supplying a substantially constant speed "sampling stoker" with fuel typical of that fed to the plurality of stokers, continuously and automatically weighing the fuel as fed from said "sampling stoker," maintaining an electrical analogue varied by and in accordance with the weight of fuel as thus being weighed and hence substantially in accordance with the varying weight of fuel per sampling stroke, continuously maintaining another electrical analogue varied by and in accordance with the total number of strokes per unit of time for all said plurality of stokers, and continuously multiplying said analogues by each other to obtain a running measurement varying according to said rate.

2. In a method of indicating or measuring the approximate rate of the total supply of fuel as fed by a plurality of reciprocating variable speed stokers, the steps which comprise: continuously supplying a "sampling stoker" with fuel typical of that fed to the plurality of stokers, continuously maintaining an electrical analogue varied by and in accordance with the total number of strokes per unit of time for all said plurality of stokers, varying the speed of said "sampling stoker" in accordance with and by said analogue, and continuously measuring the rate by weight of the feeding of fuel from said "sampling stoker," to thereby obtain a running weight measurement varying in accordance with said rate of total supply.

3. In a method of indicating or measuring the approximate rate of the total supply of fuel as fed by a plurality of reciprocating variable speed stokers, and for comparing such measurements with output energy derived from combustion of the fuel, the steps which comprise: continuously supplying a "sampling stoker" with fuel typical of that fed to the plurality of stokers, continuously maintaining an electrical analogue varied by and in accordance with the total number of strokes per unit of time for all said plurality of stokers, varying the speed of said "sampling stoker" in accordance with and by said analogue, continuously measuring the rate by weight of the feeding of fuel from said "sampling stoker," to thereby obtain a running weight measurement varying in accordance with said rate of total supply, maintaining another electrical analogue varying as the reciprocal of said weight measurement, continuously maintaining an electrical factor varying in accordance with said output, and continuously multiplying said last named analogue and said factor to obtain a running measurement of efficiency.

4. In a method of indicating or measuring the approximate rate of the total supply of fuel as fed by numerous reciprocating stokers operable respectively at different and variable speeds, the steps comprising: continuously supplying a "sampling stoker" with fuel typical of that fed to the plurality of stokers, continuously maintaining an electrical analogue varied by and in accordance with the total number of strokes per unit of time for all said plurality of stokers, continuously measuring the rate by weight of the feeding of fuel from said "sampling stoker," utilizing such weight measurements to control a variable field of force, and also utilizing said analogue to cause said force to be so modified as to vary substantially in accordance with the varying total weight of the fuel as fed per unit of time to all said plurality of stokers.

5. Apparatus for indicating or measuring the aproximate rate of the total supply of fuel as fed by a plurality of variable speed stokers, which comprises: a constant speed "sampling stoker" so positioned as to receive fuel typical of that fed to the operating stokers, means constructed and arranged for maintaining an electrical analogue varied by and in accordance with the sum of the rates of operation of all said plurality of stokers, means for continuously and automatically weighing the fuel as fed from said "sampling stoker", means constructed and arranged for maintaining another electrical analogue varied by and in accordance with the weight of fuel thus being weighed, and a wattmeter type of instrument for multiplying said analogues by each other to obtain indications of said rate of total supply at any moment.

6. Apparatus for indicating or measuring the approximate rate of the total supply of fuel as fed by a plurality of variable speed stokers, which comprises: a "sampling stoker" so positioned as to receive fuel typical of that fed to the operating stokers, means constructed and arranged for maintaining an electrical analogue varied by and in accordance with the sum of the rates of operation of all said plurality of stokers, means constructed and arranged for regulating the rate of operation of said sampling stoker by and in accordance with said analogue, and means for continuously and automatically weighing the fuel as fed from said sampling stoker, whereby the weight measurements thus obtained vary substantially in accordance with said rate of total supply.

7. Apparatus for indicating or measuring the approximate rate of the total supply of fuel as fed by a plurality of variable speed stokers, which comprises: a "sampling stoker" so positioned as to receive fuel typical of that fed from time to time to the operating stokers, means constructed and arranged for maintaining an electrical analogue varied by and in accordance with the sum of the rates of operation of all said plurality of stokers, means for continuously and automatically weighing the fuel as fed from said "sampling stoker", and means controlled by said weighing means and under the control of said analogue for maintaining a magnetic force varying substantially in accordance with the varying total weight of the fuel as fed per unit of time to all said plurality of stokers.

8. Apparatus for measuring the approximate rate of total supply of fuel as fed by a plurality of variable speed stokers of a power plant, and for continuously measuring the efficiency of the power plant, comprising a "sampling stoker" so positioned as to receive fuel typical of that fed from time to time to the operating stokers, means constructed and arranged for maintaining an electrical factor varied by and in accordance with the sum of the rates of operation of all said plurality of stokers, means for continuously and automatically weighing the fuel as fed from said "sampling stoker," means controlled by said weighing means and under the control of said varying factor for maintaining an electrical input analogue representing the varying total weight of fuel as fed per unit of time to all said plurality of stokers, a device operative substantially continuously in response to a varying factor representing the output rate of the plant and for continuously maintaining an electrical output analogue, the apparatus being so constructed and arranged that one of said analogues varies substantially directly and the other substantially inversely in proportion to the rate represented thereby, and means energized by said analogues to continuously maintain a field of force representing the varying product of said analogues, whereby such force effectively represents the varying quotient of the varying input and output rates.

CONSTANTINE P. XENIS.
WOODMAN PERINE.